(12) United States Patent
Wang et al.

(10) Patent No.: US 12,196,553 B1
(45) Date of Patent: Jan. 14, 2025

(54) METHOD AND DEVICE FOR PREDICTING FLOW CAPACITY OF ECOLOGICAL RIVER WITH VEGETATION

(71) Applicant: China Institute of Water Resources and Hydropower Research, Beijing (CN)

(72) Inventors: Weijie Wang, Beijing (CN); Wei Huang, Beijing (CN); Xiaobo Liu, Beijing (CN); Fei Dong, Beijing (CN); Zhuowei Wang, Beijing (CN); Aiping Huang, Beijing (CN); Yanfang Zhao, Beijing (CN); Fengjiao Li, Beijing (CN); Anqi Li, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 0 days.

(21) Appl. No.: 18/808,147

(22) Filed: Aug. 19, 2024

(30) Foreign Application Priority Data

May 16, 2024 (CN) .............................. 202410605185

(51) Int. Cl.
*G01C 13/00* (2006.01)
(52) U.S. Cl.
CPC ......... *G01C 13/002* (2013.01); *G01C 13/008* (2013.01)
(58) Field of Classification Search
CPC ..................... G01C 13/002; G01C 13/008
See application file for complete search history.

(56) References Cited

FOREIGN PATENT DOCUMENTS

JP 2000230224 A * 8/2000

OTHER PUBLICATIONS

Samboko, H. T., and et al. "Evaluation and improvement of remote sensing-based methods for river flow management." Physics and Chemistry of the Earth, Parts A/B/C 117 (2020): 102839 (Year: 2020).*

Arshad B, and et al. Computer Vision and IoT-Based Sensors in Flood Monitoring and Mapping: A Systematic Review. Sensors (Basel). Nov. 16, 2019;19(22):5012. doi: 10.3390/s19225012. PMID: 31744161; PMCID: PMC6891459 (Year: 2019).*

* cited by examiner

*Primary Examiner* — Douglas Kay
(74) *Attorney, Agent, or Firm* — Jeenam Park

(57) ABSTRACT

A method and device for predicting a flow capacity of an ecological river channel with vegetation are provided. The method includes: obtaining ecological rive channel geographic data during dry season and ecological zone vegetation data; obtaining a layout strategy of a liquid level sensor group based on ecological zone distribution data and ecological zone vegetation data, the layout strategy of the liquid level sensor group reflects an inundation status of emergent vegetation in the ecological zone by rivers during flood season; obtaining a prediction river flow data at a node location of the ecological zone based on a corrected roughness coefficient of the ecological zone and water level data during the flood season, the node location is a position corresponding to a cross section of the water flow. A directional monitoring for a specific zone is formed with the liquid level sensor group.

5 Claims, 3 Drawing Sheets

```
┌─────────────────────────────────────────────────────────────┐
│ Obtaining ecological rive channel geographic data during    │
│ dry season and ecological zone vegetation data, the         │
│ ecological rive channel geographic data comprises riverbed  │──S101
│ morphology data and ecological zone distribution data, the  │
│ ecological zone vegetation data comprises a distribution    │
│ parameter of emergent vegetation in the ecological zone, a  │
│ tree crown height parameter, and a tree trunk height        │
│ parameter                                                    │
└─────────────────────────────────────────────────────────────┘
                              ↓
┌─────────────────────────────────────────────────────────────┐
│ Obtaining a layout strategy of a liquid level sensor group   │
│ based on the ecological zone distribution data and          │──S102
│ ecological zone vegetation data; the layout strategy of the │
│ liquid level sensor group reflects an inundation status of  │
│ emergent vegetation in the ecological zone by rivers during │
│ flood season                                                 │
└─────────────────────────────────────────────────────────────┘
                              ↓
┌─────────────────────────────────────────────────────────────┐
│ Providing the liquid level sensor group on the emergent      │
│ vegetation in the ecological zone based on the layout       │
│ strategy of the liquid level sensor group, establishing a   │
│ communication connection of the liquid level sensor group   │──S103
│ to obtain an observation point liquid level information in  │
│ the ecological zone; the observation point liquid level     │
│ information in the ecological zone comprises observation    │
│ point number, an observation point liquid level start       │
│ signal, an observation point loss signal, and an            │
│ observation point liquid level signal                        │
└─────────────────────────────────────────────────────────────┘
                              ↓
┌─────────────────────────────────────────────────────────────┐
│ Obtaining the observation point liquid level information in │
│ the ecological zone during the flood season and obtaining a │
│ corrected roughness coefficient of the ecological zone;     │──S104
│ obtaining a prediction river flow data at a node position   │
│ of the ecological zone based on the corrected roughness     │
│ coefficient of the ecological zone and water level data     │
│ during the flood season, where the node position is a       │
│ position corresponding to a cross-section of the river      │
│ water flow                                                   │
└─────────────────────────────────────────────────────────────┘
```

FIG. 1

METHOD AND DEVICE FOR PREDICTING FLOW CAPACITY OF ECOLOGICAL RIVER WITH VEGETATION

CROSS-REFERENCE TO RELATED APPLICATIONS

This application claims priority to Chinese Patent Application No. 202410605185.2, filed on May 16, 2024, which is hereby incorporated by reference in its entirety.

TECHNICAL FIELD

The present disclosure relates to the field of intelligent monitoring technology for ecological river zones technologies, and in particular, to a method and device for predicting a flow capacity of an ecological river channel with vegetation.

BACKGROUND

With a large-scale design, renovation, and construction of ecological river channels, river systems that carry more aquatic plants have covered more and more river zones. Aquatic plants can serve as habitats for river animals and plants and provide more support for stabilizing riverbed morphology and constructing river ecological landscapes.

There has been extensive and in-depth research on the prediction of the flow capacity of ecological river channels during flood season, but the prediction of flow capacity still leans towards theoretical research. For example, when predicting an impact of the lodging of emergent vegetation on water flow resistance, an overall flow prediction is usually only made by monitoring a depth of water flow. A specific correspondence between the depth of water flow in specific ecological zone and the lodging of emergent vegetation is mainly based on experience rather than an actual survey. However, there are limitations in monitoring methods and high monitoring costs in actual observation and survey during flood season. Currently, there is no effective means to solve this problem. Thus, there is also a certain deviation in a specific calculation of the flow capacity of river channels, especially when there is a large inflow during flood season, it will affect a vegetation coverage of existing ecological zones. These specific, real-time changes cannot be solved by the existing river channel flow capacity prediction schemes. Therefore, it is necessary to further improve and perfect the existing methods, while controlling monitoring costs to avoid obstacles to the implementation of the plan due to high monitoring costs.

SUMMARY

A purpose of the present disclosure is to provide a method and device for predicting a flow capacity of an ecological river channel with vegetation, in response to the shortcomings of the existing technologies mentioned above.

According to an embodiment of the present disclosure, a first aspect provides a method for predicting a flow capacity of an ecological river channel with vegetation, including the following steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

In an embodiment of the present disclosure, the obtaining the layout strategy of liquid level sensor group based on the ecological zone distribution data and ecological zone vegetation data includes:

taking a flat zone or edge zone in the ecological zone as an observation zone, and obtaining a layout density of the liquid level sensor based on a coverage area of the emergent vegetation within the observation zone; a horizontal density range of the liquid level sensor group is 36-100 pieces/km$^2$;

calculating a layout height of the liquid level sensor group based on the riverbed morphology data, tree crown height parameter, and tree trunk height parameter in the observation zone; in the flat zone, the layout height of the liquid level sensor group is an average tree trunk height of the emergent vegetation, or an average tree crown layout height of the emergent vegetation; in the edge zone, the layout height of the liquid level sensor group is that each liquid level sensor is provided at a connection position between a main trunk of a target emergent plant and a first branch of the target emergent plant;

the average crown layout height=average tree trunk height+average tree crown height/2.

In an embodiment of the present disclosure, the layout strategy of the liquid level sensor group reflecting an inundation status of emergent vegetation in the ecological zone by rivers during flood season includes:

in the flat zone, when the layout height of the liquid level sensor group is the average tree trunk height of the emergent vegetation, identifying the liquid level start signal fed back by the liquid level sensor in a target observation zone of the river during the flood season, when a first observation point liquid level start signal is identified and received, the inundation status of the emergent vegetation in the observation zone is that the tree trunk has not been submerged, when all observation point liquid level start signals are received, the inundation status of the emergent vegetation in the observation zone is that the tree trunk has been submerged;

in the flat zone, when the layout height of the liquid level sensor group is equal to the average tree crown layout height of the emergent vegetation, identifying the observation point liquid level start signal fed back by the liquid level sensor in the target observation zone of the river during the flood season; when the first observation point liquid level start signal is identified and received, the inundation status of the emergent vegetation in the observation zone is that the canopy has not been submerged, when all observation point liquid level start signals are received, the inundation status of the emergent vegetation in the observation zone is that the canopy has been submerged;

in the edge zone, the layout height of the liquid level sensor group is that each liquid level sensor is provided at the connection position between the main trunk of the target emergent plant and the first branch of the target emergent plant, the liquid level start signal fed back by the liquid level sensor in the target observation zone of the river during the flood season is recognized; when the first observation point liquid level start signal is identified and received, the inundation status of the emergent vegetation in the observation zone is that the trunk has not been submerged; when all observation points liquid level start signals are received, the inundation status of the emergent vegetation in the observation zone is that the crown has been submerged.

In an embodiment of the present disclosure, the establishing a communication connection of the liquid level sensor group includes:

providing with a remote communication relay station in the observation zone to obtain the observation point liquid level information fed back by the liquid level sensor group within the observation zone through the remote communication relay station.

In an embodiment of the present disclosure, the obtaining the observation point liquid level information in the ecological zone during the flood season and obtaining a corrected roughness coefficient of the ecological zone include:

adjusting Froude coefficient of the emergent vegetation based on the inundation status of the emergent vegetation that the trunk has not been submerged, the trunk has been submerged, or the crown has been submerged in the observation zone, and obtaining the corrected roughness coefficient of the ecological zone through the adjusted Froude coefficient of the emergent vegetation and an initial roughness coefficient in the riverbed morphology data.

In an embodiment of the present disclosure, the obtaining a prediction river flow data at a node position of the ecological zone based on the corrected roughness coefficient of the ecological zone and the water level data during the flood season includes:

calculating river flow prediction data at a node location of the ecological zone based on corrected ecological zone roughness coefficient, cross section area parameter, hydraulic radius parameter, ecological zone slope parameter, and Manning formula.

In an embodiment of the present disclosure, the node position of the prediction river flow data is obtained through an abnormal signal monitored by the liquid level sensor group.

In an embodiment of the present disclosure, obtaining the abnormal signal monitored by the liquid level sensor group includes:

receiving observation point liquid level signal fed back by the liquid level sensor within the observation zone in unit time through the remote communication relay station, and generating an observation point loss signal when the observation point liquid level signal is lost;

generating observation point loss distribution information for the liquid level sensor group based on the observation point number bound to the observation point lost signal;

generating a maximum width position for the observation point based on the observation point loss distribution information;

determining at least one node position in the ecological zone based on the maximum width position for the observation point.

In an embodiment of the present disclosure, the method further includes generating water flow impact distribution information through the observation point loss signal of the liquid level sensor group, and the water flow impact distribution information reflects washing off emergent vegetation or sediment burial status in the observation zone by an incoming flow.

According to an embodiment of the present disclosure, a second aspect provides a device for predicting a flow capacity of an ecological river channel with vegetation, including: a dry season data acquisition module, configured to obtain geographic data of the ecological rive channel during dry season and vegetation data of ecological zones, the geographic data of the ecological rive channel includes riverbed morphology data and ecological zone distribution data, the ecological zone vegetation data includes a distribution parameter of emergent vegetation in the ecological zone, a tree crown height parameter, and a tree trunk height parameter;

a layout strategy acquisition module, configured to obtain a layout strategy of a liquid level sensor group based on the ecological zone distribution data and ecological zone vegetation data; the layout strategy of the liquid level sensor group reflects an inundation status of emergent vegetation in the ecological zone by rivers during flood season;

a liquid level information acquisition module, configured to provide the liquid level sensor group on the emergent vegetation in the ecological zone based on the layout strategy of the liquid level sensor group, establish a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

a river flow prediction module, configured to obtain the observation point liquid level information in the ecological zone during the flood season and obtain a corrected roughness coefficient of the ecological zone; obtain a prediction river flow data at a node position of the ecological zone based on the corrected roughness coefficient of the ecological zone and water level data during the flood season, where the node position is a position corresponding to a cross-section of the river water flow.

A computer device including a memory and a processor, where the memory stores a computer program, when executed by the processor, the processor is caused to perform the following steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

A computer-readable storage medium that stores a computer program, when executed by a processor, the processor is caused to perform the following steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

Compared with existing technology, the advantageous effect of the technical solution provided by the present application is that a liquid level sensor group is formed by low-cost liquid level sensors. In addition to providing water depth parameters of observation points, the liquid level sensors also form a directional monitoring of a specific zone through the group. For example, the layout strategy of the liquid level sensor can accurately and real-time feedback an inundation status of emergent vegetation in the ecological zone by rivers during flood season, and then accurately adjust the roughness coefficient of the ecological zone and optimize a final river flow prediction data.

BRIEF DESCRIPTION OF DRAWINGS

In order to provide a clearer explanation of the embodiments of the present disclosure or the technical solutions in the prior art, a brief introduction will be given below to the accompanying drawings required in the embodiments or prior art description. It is obvious that the accompanying drawings in the following description are only some embodiments of the present disclosure. For those skilled in the art, other accompanying drawings can be obtained based on these drawings without creative work.

FIG. 1 is a flowchart of a method for predicting a flow capacity of an ecological river channel with vegetation in an embodiment.

Figure 2:
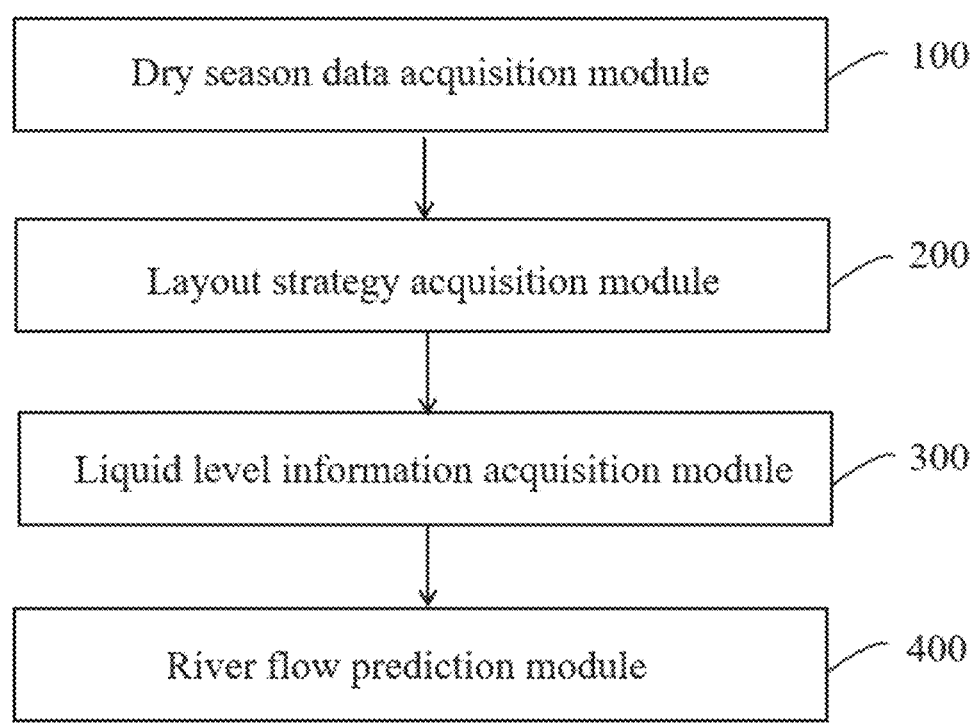
FIG. 2 is a structural diagram of a device for predicting a flow capacity of an ecological river channel with vegetation in an embodiment.

Numeral reference: 100—dry season data acquisition module; 200—layout strategy acquisition module; 300—liquid level information acquisition module; 400—river flow prediction module.

DESCRIPTION OF EMBODIMENTS

In order to enable technical personnel in this field to better understand the technical solution in the present application, the following will provide a clear and complete description of the technical solution in the embodiment of the present application in combination with the accompanying drawings. Obviously, the described embodiments are only a part of the embodiments in the present application, not all of them. Based on the embodiments in the present application, all other embodiments obtained by ordinary technical personnel in this field without creative work fall within the protection scope of the present application.

Embodiment 1: a technical problem solved by this embodiment is that there has been extensive and in-depth research on the prediction of the flow capacity of ecological river channels during flood season, but the prediction of flow capacity still leans towards theoretical research. For example, when predicting an impact of the lodging of emergent vegetation on water flow resistance, an overall flow prediction is usually only made by monitoring a depth of water flow. A specific correspondence between the depth of water flow in specific ecological zone and the lodging of emergent vegetation is mainly based on experience rather than an actual survey. However, there are limitations in monitoring methods and high monitoring costs in actual observation and survey during flood season. Currently, there is no effective means to solve this problem. Thus, there is also a certain deviation in a specific calculation of the flow capacity of river channels, especially when there is a large inflow during flood season, it will affect a vegetation coverage of existing ecological zones. These specific, real-time changes cannot be solved by the existing river channel flow capacity prediction schemes.

In order to solve the above technical problems, this embodiment provides a method for predicting a flow capacity of an ecological river channel with vegetation, as shown in FIG. 1, including the following steps:

S101: obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

during the dry season, due to a small flow rate of the river, surveyors or survey tools such as survey drones or survey satellite images can cover more zones and obtain higher accuracy data. At the same time, after a sharp increase in river flow during the flood season, a change in river morphology is continuous, and the basis for the change is still an initial river flow rate during the dry season. Therefore, selecting the dry season to collect geographical data of the river channel is more efficient and reasonable.

In an implementation, the riverbed morphology parameter includes a riverbed initial roughness coefficient and a riverbed slope parameter.

The ecological zone distribution data includes ecological zone number, vegetation types, distribution density, distribution zone, etc.

S102: obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season.

When monitoring the vegetation status in the ecological zone is designed, a usual solution is to measure the trunk height and crown height of vegetation such as emergent vegetation through measurement or imaging. However, if accurate data is needed, the cost of these solutions is relatively high. In order to facilitate the implementation of the solution, the present disclosure uses liquid level sensors for data collection. Liquid level sensors are widely used in hydrological field, and based on price advantage of centralized procurement, the cost of the liquid level sensors can be further reduced. Generally, the cost of a liquid level sensor is only a few Yuan, and an ecological or observation zone requires at most hundreds of sensors for providing. Therefore, the cost of accurate and real-time monitoring equipment for an ecological zone is controlled within a few hundred Yuan, which is very suitable for promotion and application.

In addition to measuring a depth of a submerged liquid level and calculating the water depth, this method mainly utilizes the layout strategy of sensor group to achieve specific data collection and corresponding monitoring functions or purposes. The specific explanation is provided in Embodiment 2.

S103: providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal.

S104: obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow. A correction method for the roughness coefficient of ecological zone and the calculation method for river flow can be calculated based on different theories in this field. This scheme is applicable to various calculation methods.

In an implementation, the obtaining the observation point liquid level information in the ecological zone during the flood season and obtaining a corrected roughness coefficient of the ecological zone includes: adjusting Froude coefficient of the emergent vegetation based on the inundation status of the emergent vegetation that the trunk has not been submerged, the trunk has been submerged, or the crown has been submerged in the observation zone, and obtaining the corrected roughness coefficient of the ecological zone through the adjusted Froude coefficient of the emergent vegetation and an initial roughness coefficient in the riverbed morphology data.

In an implementation, the obtaining a prediction river flow data at a node position of the ecological zone based on the corrected roughness coefficient of the ecological zone and the water level data during the flood season includes calculating river flow prediction data at a node location of the ecological zone based on corrected ecological zone roughness coefficient, cross section area parameter, hydraulic radius parameter, ecological zone slope parameter, and Manning formula.

The beneficial effect of the technical solution provided in the present application is that a liquid level sensor group is formed by low-cost liquid level sensors. In addition to providing water depth parameters of observation points, the liquid level sensors also form a directional monitoring of a specific zone through the group. For example, the layout strategy of the liquid level sensor can accurately and real-time feedback an inundation status of emergent vegetation in the ecological zone by rivers during flood season, and then accurately adjust the roughness coefficient of the ecological zone and optimize a final river flow prediction data.

Embodiment 2: based on the scheme of Embodiment 1, this scheme further provides a method for predicting a flow capacity of an ecological river channel with vegetation, including the steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

The obtaining the layout strategy of liquid level sensor group based on the ecological zone distribution data and ecological zone vegetation data includes:

taking a flat zone or edge zone in the ecological zone as an observation zone, and obtaining a layout density of the liquid level sensor based on a coverage area of the emergent vegetation within the observation zone; a horizontal density range of the liquid level sensor group is 36-100 pieces/km$^2$; in an implementation, a matrix arrangement is used based on a regional condition of the observation zone, for example, when the horizontal density range is 36 pieces/km$^2$, 6*6 liquid level sensors are provided in a matrix within 1 square kilometer;

calculating a layout height of the liquid level sensor group based on the riverbed morphology data, tree crown height parameter, and tree trunk height parameter in the observation zone; in the flat zone, the layout height of the liquid level sensor group is an average tree trunk height of the emergent vegetation, or an average tree crown layout height of the emergent vegetation; in the edge zone, the layout height of the liquid level sensor group is that each liquid level sensor is provided at a connection position between a main trunk of a target emergent plant and a first branch of the target emergent plant;

the average crown layout height=average tree trunk height+average tree crown height/2.

When the liquid lever sensor group is provided in the above installation manner, the layout strategy of the liquid level sensor group reflecting an inundation status of emergent vegetation in the ecological zone by rivers during flood season includes:

in the flat zone, when the layout height of the liquid level sensor group is the average tree trunk height of the emergent vegetation, identifying the liquid level start signal fed back by the liquid level sensor in a target observation zone of the river during the flood season, when a first observation point liquid level start signal is identified and received, the inundation status of the emergent vegetation in the observation zone is that the tree trunk has not been submerged, when all observation point liquid level start signals are received, the inundation status of the emergent vegetation in the observation zone is that the tree trunk has been submerged;

in the flat zone, when the layout height of the liquid level sensor group is equal to the average tree crown layout height of the emergent vegetation, identifying the observation point liquid level start signal fed back by the liquid level sensor in the target observation zone of the river during the flood season; when the first observation point liquid level start signal is identified and received, the inundation status of the emergent vegetation in the observation zone is that the canopy has not been submerged, when all observation point liquid level start signals are received, the inundation status of the emergent vegetation in the observation zone is that the canopy has been submerged;

in the edge zone, the layout height of the liquid level sensor group is that each liquid level sensor is provided at the connection position between the main trunk of the target emergent plant and the first branch of the target emergent plant, the liquid level start signal fed back by the liquid level sensor in the target observation zone of the river during the flood season is recognized; when the first observation point liquid level start signal is identified and received, the inundation status of the emergent vegetation in the observation zone is that the trunk has not been submerged; when all observation points liquid level start signals are received, the inundation status of the emergent vegetation in the observation zone is that the crown has been submerged.

Through this scheme, accurate and real-time feedback on changes in water surface height during flood season and the real-time coverage status of emergent vegetation in specific observation zones when water surface height rises can be obtained through the liquid level sensor and the liquid level sensor group. A prediction algorithm for river flow capacity can be adjusted in real-time, enabling more accurate prediction of river flow data at ecological zone node location.

Embodiment 3: when the liquid level sensor group is provided in a specific observation zone, monitoring of specific functions can only be achieved through specific analysis of the liquid level sensor group. This embodiment provides a method for predicting a flow capacity of an ecological river channel with vegetation. The method provides with a remote communication relay station in the observation zone to obtain the observation point liquid level information fed back by the liquid level sensor group within the observation zone through the remote communication relay station.

By a remote communication relay station, real-time monitoring and analysis of multiple observation points within the observation zone can be achieved, enabling the monitoring and analysis of regional status and changes.

In an implementation, the node position of the prediction river flow data is obtained through an abnormal signal monitored by the liquid level sensor group. The selection of node position is currently usually based on experience or only as a general data for a theoretical calculation and cannot reflect a specific node position of specific ecological or observation zone. However, accurate selection of node position can provide more accurate feedback on whether key locations in ecological zone has been significantly affected by the flow capacity through predicting the flow capacity of river channel, thereby providing practical work suggestion for risk prevention or vegetation planting or replanting.

In an implementation, obtaining the abnormal signal monitored by the liquid level sensor group includes:

receiving observation point liquid level signal fed back by the liquid level sensor within the observation zone in unit time through the remote communication relay station, and generating an observation point loss signal when the observation point liquid level signal is lost;

generating observation point loss distribution information for the liquid level sensor group based on the observation point number bound to the observation point lost signal;

generating a maximum width position for the observation point based on the observation point loss distribution information;

determining at least one node position in the ecological zone based on the maximum width position for the observation point.

In an implementation, the method further includes generating water flow impact distribution information through the observation point loss signal of the liquid level sensor group, and the water flow impact distribution information reflects washing off emergent vegetation or sediment burial status in the observation zone by an incoming flow.

In addition to utilizing the liquid level information of the liquid level sensor for analysis and utilization, the signal loss of the liquid level sensor can also reflect the actual status monitoring of the emergent vegetation affected by an incoming flow.

Embodiment 4: this embodiment provides a device for predicting a flow capacity of an ecological river channel with vegetation, as shown in FIG. 2, including:

a dry season data acquisition module 100, configured to obtain geographic data of the ecological rive channel during dry season and vegetation data of ecological zones, the geographic data of the ecological rive channel includes riverbed morphology data and ecological zone distribution data, the ecological zone vegetation data includes a distribution parameter of emergent vegetation in the ecological zone, a tree crown height parameter, and a tree trunk height parameter;

a layout strategy acquisition module 200, configured to obtain a layout strategy of a liquid level sensor group based on the ecological zone distribution data and ecological zone vegetation data; the layout strategy of the liquid level sensor group reflects an inundation status of emergent vegetation in the ecological zone by rivers during flood season;

a liquid level information acquisition module 300, configured to provide the liquid level sensor group on the emergent vegetation in the ecological zone based on the layout strategy of the liquid level sensor group, establish a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

a river flow prediction module 400, configured to obtain the observation point liquid level information in the ecological zone during the flood season and obtain a corrected roughness coefficient of the ecological zone; obtain a prediction river flow data at a node position of the ecological zone based on the corrected roughness coefficient of the ecological zone and water level data during the flood season, where the node position is a position corresponding to a cross-section of the river water flow.

The liquid level sensor group is formed by low-cost liquid level sensors. In addition to providing water depth parameters of observation points, the liquid level sensors also form a directional monitoring of a specific zone through the group. For example, the layout strategy of the liquid level sensor can accurately and real-time feedback an inundation status of emergent vegetation in the ecological zone by rivers during flood season, and then accurately adjust the roughness coefficient of the ecological zone and optimize a final river flow prediction data.

Figure 3:
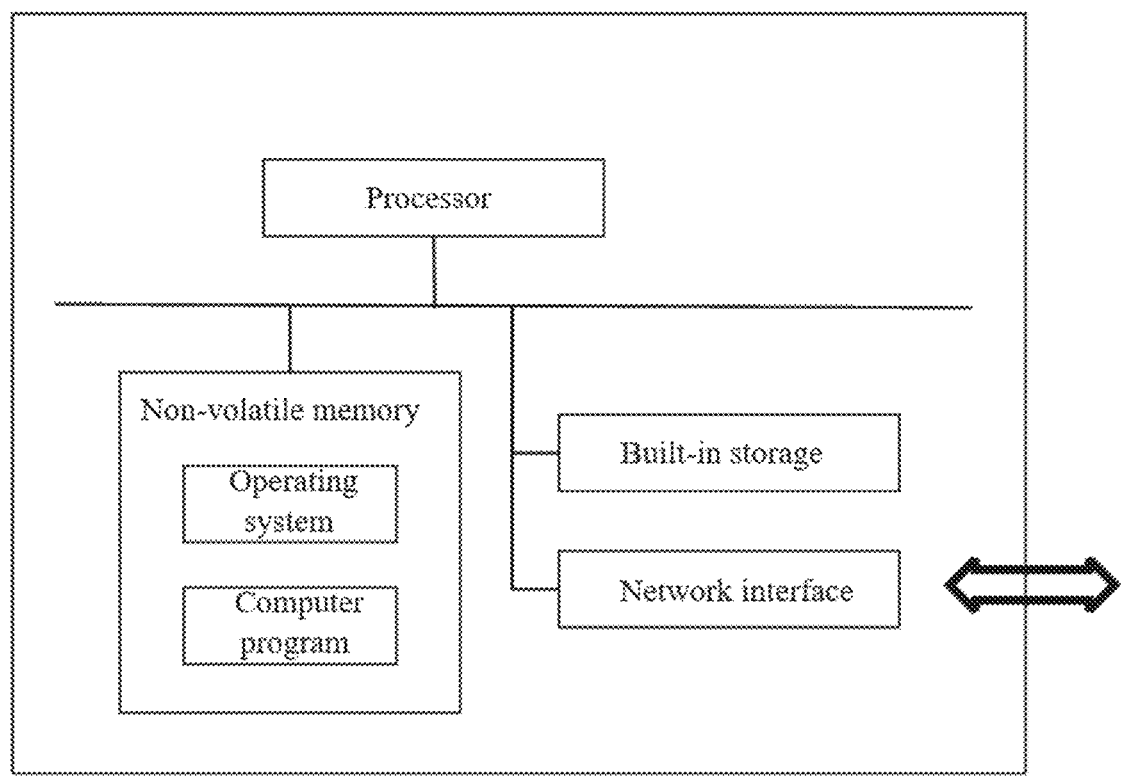
FIG. 3 is a structural diagram of a computer device in an embodiment.

Embodiment 5: FIG. 3 shows an internal structure diagram of a computer device in an embodiment. The computer device can be either a terminal or a server. As shown in FIG. 3, the computer device includes a processor, a memory, and a network interface connected through a system bus. The memory includes a non-volatile storage media and a built-in storage. The non-volatile storage medium of this computer device stores an operating system and can also store a computer program. When the computer program is executed by the processor, it can enable the processor to implement the method for predicting a flow capacity of an ecological river channel with vegetation. The built-in storage can also store a computer program, which, when executed by the processor, can enable the processor to execute the method for predicting a flow capacity of an ecological river channel with vegetation. Technicians in this field can understand that the structure shown in FIG. 3 is only a block diagram of a part of the structure related to the present application and does not constitute a limitation on the computer device applied to it. The specific computer device may include more or fewer components than shown in the drawings, or a combination of certain components, or have different component arrangements.

In an embodiment, a computer device is provided, including a memory and a processor, where the memory stores a computer program, and when the computer program is executed by the processor, the processor performs the following steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

In an embodiment, a computer-readable storage medium is provided, which stores a computer program, when executed by a processor, the processor is caused to perform the following steps:

obtaining ecological rive channel geographic data during dry season and ecological zone vegetation data, the ecological rive channel geographic data includes riverbed morphology data and ecological zone distribution data, the ecological zone vegetation data includes a distribution parameter of emergent vegetation in the ecological zone, a tree crown height parameter, and a tree trunk height parameter;

obtaining a layout strategy of a liquid level sensor group based on the ecological zone distribution data and ecological zone vegetation data; the layout strategy of the liquid level sensor group reflects an inundation status of emergent vegetation in the ecological zone by rivers during flood season;

providing the liquid level sensor group on the emergent vegetation in the ecological zone based on the layout strategy of the liquid level sensor group, establishing a communication connection of the liquid level sensor group to obtain an observation point liquid level information in the ecological zone; the observation point liquid level information in the ecological zone includes observation point number, an observation point liquid level start signal, an observation point loss signal, and an observation point liquid level signal;

obtaining the observation point liquid level information in the ecological zone during the flood season and obtaining a corrected roughness coefficient of the ecological zone; obtaining a prediction river flow data at a node position of the ecological zone based on the corrected roughness coefficient of the ecological zone and water level data during the flood season, where the node position is a position corresponding to a cross-section of the river water flow.

Ordinary technical personnel in this field can understand that implementing all or part of the processes in the above-mentioned embodiments can be completed by instructing relevant hardware through computer programs. The program can be stored in a non-volatile computer-readable storage medium, and when executed, it may include processes in the embodiments of the above-mentioned methods. Any reference to memory, storage, database, or other media used in the various embodiments provided in the present application may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include random access memory (RAM) or external cache memory. As an explanation rather than limitation, RAM can be obtained in various forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), Rambus direct RAM (RDRAM), direct memory bus dynamic RAM (DRDRAM), and memory bus dynamic RAM (RDRAM).

The various technical features of the above embodiments can be combined in any way. To render the description concise, all possible combinations of the various technical features in the above embodiments have not been described. However, as long as there is no contradiction in the combination of these technical features, they should be considered within the scope of this specification.

The above embodiments only show several embodiments of the present application, and the description is more specific and detailed. However, it cannot be understood as a limitation on the scope of the present application. It should be noted that for those skilled in the art, several modifications and improvements can be made without departing from the concept of the present application, all of which fall within the protection scope of the present application. Therefore, the protection scope of the present application shall be based on the attached claims.

What is claimed is:

1. A method for predicting a flow capacity of an ecological river channel with vegetation, comprising the following steps:

obtaining ecological river channel geographic data during dry season and ecological zone vegetation data, the ecological river channel geographic data comprises riverbed morphology data and ecological zone distribution data, the ecological zone vegetation data comprises a distribution parameter of an emergent vegetation in an ecological zone, a tree crown height parameter, and a tree trunk height parameter;

obtaining a layout strategy of a liquid level sensor group based on the ecological zone distribution data and the ecological zone vegetation data, wherein the layout strategy of the liquid level sensor group reflects an inundation status of the emergent vegetation in the ecological zone encompassing rivers during a flood season;

providing the liquid level sensor group on the emergent vegetation in the ecological zone based on the layout strategy of the liquid level sensor group, establishing a communication connection of the liquid level sensor group to obtain an observation point liquid level information in the ecological zone;

the observation point liquid level information in the ecological zone comprises observation point number, an observation point liquid level start signal, an observation point loss signal, and an observation point liquid level signal;

obtaining the observation point liquid level information in the ecological zone during the flood season and obtaining a corrected roughness coefficient of the ecological zone;

obtaining a prediction river flow data at a node position of the ecological zone based on the corrected roughness coefficient of the ecological zone and water level data during the flood season, wherein the node position is a position corresponding to a cross-section of a river water flow;

wherein the obtaining the layout strategy of the liquid level sensor group based on the ecological zone distribution data and the ecological zone vegetation data comprises:

taking a flat zone or an edge zone in the ecological zone as an observation zone, and obtaining a layout density of a liquid level sensor based on a coverage area of an emergent vegetation within the observation zone;

a horizontal density range of the liquid level sensor group is 36-100 pieces/km2;

calculating a layout height of the liquid level sensor group based on the riverbed morphology data, a tree crown height parameter, and a tree trunk height parameter in the observation zone;

in the flat zone, the layout height of the liquid level sensor group is an average tree trunk height of the emergent vegetation, or an average tree crown layout height of the emergent vegetation;

in the edge zone, the layout height of the liquid level sensor group is that each liquid level sensor is provided at a connection position between a main trunk of a target emergent plant and a first branch of the target emergent plant;

wherein the average crown layout height=average tree trunk height+average tree crown height/2;

wherein the layout strategy of the liquid level sensor group reflecting an inundation status of the emergent vegetation in the ecological zone encompassing rivers during a flood season comprises:

in the flat zone, when the layout height of the liquid level sensor group is the average tree trunk height of the emergent vegetation, identifying the liquid level start signal fed back by the liquid level sensor in a target observation zone of the river during the flood season, when a first observation point liquid level start signal is identified and received, the inundation status of the emergent vegetation in the observation zone is that the tree trunk has not been submerged, when all observation point liquid level start signals are received, the inundation status of the emergent vegetation in the observation zone is that the tree trunk has been submerged;

in the flat zone, when the layout height of the liquid level sensor group is equal to the average tree crown layout height of the emergent vegetation, identifying the observation point liquid level start signal fed back by the liquid level sensor in the target observation zone of the river during the flood season;

when the first observation point liquid level start signal is identified and received, the inundation status of the emergent vegetation in the observation zone is that a canopy has not been submerged, when all observation point liquid level start signals are received, the inundation status of the emergent vegetation in the observation zone is that the canopy has been submerged;

in the edge zone, the layout height of the liquid level sensor group is that each liquid level sensor is provided at the connection position between the main trunk of the target emergent plant and the first branch of the target emergent plant, the liquid level start signal fed back by the liquid level sensor in the target observation zone of the river during the flood season is recognized;

when the first observation point liquid level start signal is identified and received, the inundation status of the emergent vegetation in the observation zone is that the trunk has not been submerged;

when all observation points liquid level start signals are received, the inundation status of the emergent vegetation in the observation zone is that a tree crown has been submerged;

wherein the obtaining the observation point liquid level information in the ecological zone during the flood season and obtaining a corrected roughness coefficient of the ecological zone comprises:

adjusting Froude coefficient of the emergent vegetation based on the inundation status of the emergent vegetation that the trunk has not been submerged, the trunk has been submerged, or the crown has been submerged in the observation zone, and obtaining the corrected roughness coefficient of the ecological zone through the adjusted Froude coefficient of the emergent vegetation and an initial roughness coefficient in the riverbed morphology data;

wherein the obtaining a prediction river flow data at a node position of the ecological zone based on the corrected roughness coefficient of the ecological zone and the water level data during the flood season comprises calculating river flow prediction data at a node location of the ecological zone based on corrected ecological zone roughness coefficient, a cross-section area parameter, a hydraulic radius parameter, an ecological zone slope parameter, and Manning formula.

2. The method for predicting a flow capacity of an ecological river channel with vegetation according to claim 1, wherein the establishing a communication connection of the liquid level sensor group comprises:

providing with a remote communication relay station in the observation zone to obtain the observation point liquid level information fed back by the liquid level sensor group within the observation zone through the remote communication relay station.

3. The method for predicting a flow capacity of an ecological river channel with vegetation according to claim 1, wherein the node position of the prediction river flow data is obtained through an abnormal signal monitored by the liquid level sensor group.

4. The method for predicting a flow capacity of an ecological river channel with vegetation according to claim 3, wherein obtaining the abnormal signal monitored by the liquid level sensor group comprises:

receiving observation point liquid level signal fed back by the liquid level sensor within the observation zone in unit time through the remote communication relay station, and generating an observation point loss signal when the observation point liquid level signal is lost;

generating observation point loss distribution information for the liquid level sensor group based on the observation point number bound to the observation point lost signal;

generating a maximum width position for the observation point based on the observation point loss distribution information;

determining at least one node position in the ecological zone based on the maximum width position for the observation point.

5. The method for predicting a flow capacity of an ecological river channel with vegetation according to claim 4, wherein the method further comprises: generating water flow impact distribution information through the observation point loss signal of the liquid level sensor group, and the water flow impact distribution information reflects washing off emergent vegetation or sediment burial status in the observation zone by an incoming flow.

* * * * *